US007879283B2

United States Patent
Hartley et al.

(10) Patent No.: US 7,879,283 B2
(45) Date of Patent: Feb. 1, 2011

(54) SIZER FOR FORMING SHAPED POLYMERIC ARTICLES AND METHOD OF SIZING POLYMERIC ARTICLES

(75) Inventors: Kevin D. Hartley, Clarklake, MI (US); Robert C. McEldowney, Jackson, MO (US); Thomas G. Gilbert, Clarklake, MI (US); Thomas A. Gates, Parma, MO (US)

(73) Assignee: Certainteed Corporation, Valley Forge, PA (US)

( * ) Notice: Subject to any disclaimer, the term of this patent is extended or adjusted under 35 U.S.C. 154(b) by 0 days.

(21) Appl. No.: 12/550,490

(22) Filed: Aug. 31, 2009

(65) Prior Publication Data

US 2009/0315207 A1    Dec. 24, 2009

Related U.S. Application Data

(60) Continuation of application No. 11/294,956, filed on Dec. 6, 2005, now abandoned, which is a division of application No. 10/428,227, filed on May 2, 2003, now Pat. No. 7,001,165.

(51) Int. Cl.
  B29C 39/14   (2006.01)
  B29C 39/42   (2006.01)
  B29C 39/44   (2006.01)
  B29C 47/12   (2006.01)
  B29C 47/90   (2006.01)

(52) U.S. Cl. .............. 264/560; 264/562; 264/571; 264/151; 264/177.17; 264/178 R; 264/210.1; 264/211.13

(58) Field of Classification Search .......... 264/522, 264/544, 555, 557, 560, 561, 562, 571, 101, 264/102, 145, 148, 151, 165, 167, 176.1, 264/177.1, 177.17, 177.19, 178 R, 179, 180, 264/210.1, 210.3, 210.4, 210.5, 211.12, 211.13
See application file for complete search history.

(56) References Cited

U.S. PATENT DOCUMENTS

| | | | |
|---|---|---|---|
| 3,546,745 | A | 12/1970 | Ball |
| 4,401,424 | A | 8/1983 | De Zen |
| 4,468,369 | A | 8/1984 | Gauchel et al. |
| 4,543,051 | A | 9/1985 | Maillefer |
| 4,960,554 | A | 10/1990 | Bambrick |
| 5,316,459 | A | 5/1994 | Melkonian et al. |
| 5,480,295 | A | 1/1996 | Greve |
| 5,505,058 | A | 4/1996 | Dorninger |
| 5,514,325 | A | 5/1996 | Purstinger |

(Continued)

OTHER PUBLICATIONS

Friedwald, David, "Vacuum Sizer Design Manufacture and Use" © 1994.

(Continued)

*Primary Examiner*—Joseph S Del Sole
*Assistant Examiner*—Ryan Ochylski
(74) *Attorney, Agent, or Firm*—Duane Morris LLP

(57) ABSTRACT

A sizer assembly for providing a shaped polymeric article in an extrusion process includes a sizer body having a product profile channel corresponding to the shaped polymeric article formed therethrough. The sizer body includes a plurality of cooling liquid inlet slots forming an opening substantially around the product profile channel and a plurality of vacuum slots forming an opening substantially around the product profile channel for removing cooling liquid expelled from said cooling liquid inlet slots.

20 Claims, 4 Drawing Sheets

U.S. PATENT DOCUMENTS

| | | |
|---|---|---|
| 5,516,270 A | 5/1996 | Lehtinen |
| 5,648,102 A | 7/1997 | Czarnik |
| 5,882,564 A | 3/1999 | Puppin |
| 5,965,075 A | 10/1999 | Pauley et al. |
| 6,200,119 B1 | 3/2001 | Pelto et al. |
| 6,210,616 B1 | 4/2001 | Suwanda |
| 6,287,102 B1 | 9/2001 | Franz et al. |
| 6,319,456 B1 | 11/2001 | Gilbert et al. |
| 2001/0049918 A1 | 12/2001 | Gilbert |

OTHER PUBLICATIONS

Technical Service Report "Extrusion of Geon® Rigid Cellular Vinyl," PolyOne Corporation, Apr. 1993.

International Search Report and Written Opinion of the International Searching Authority for corresponding International Application No. PCT/US04/11300 mailed Apr. 5, 2005.

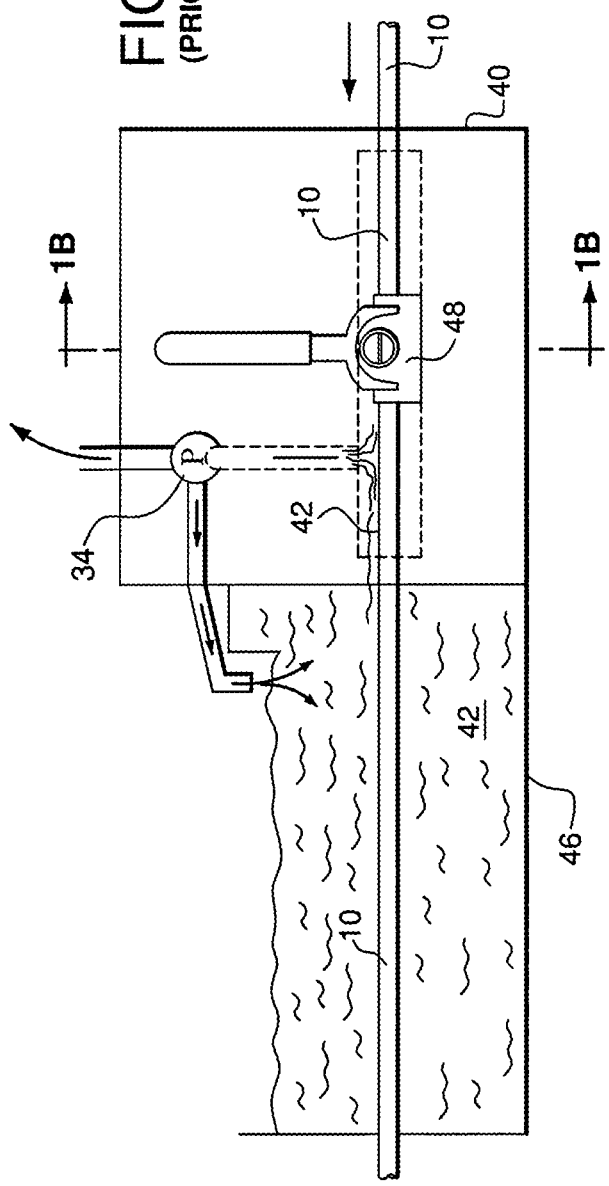
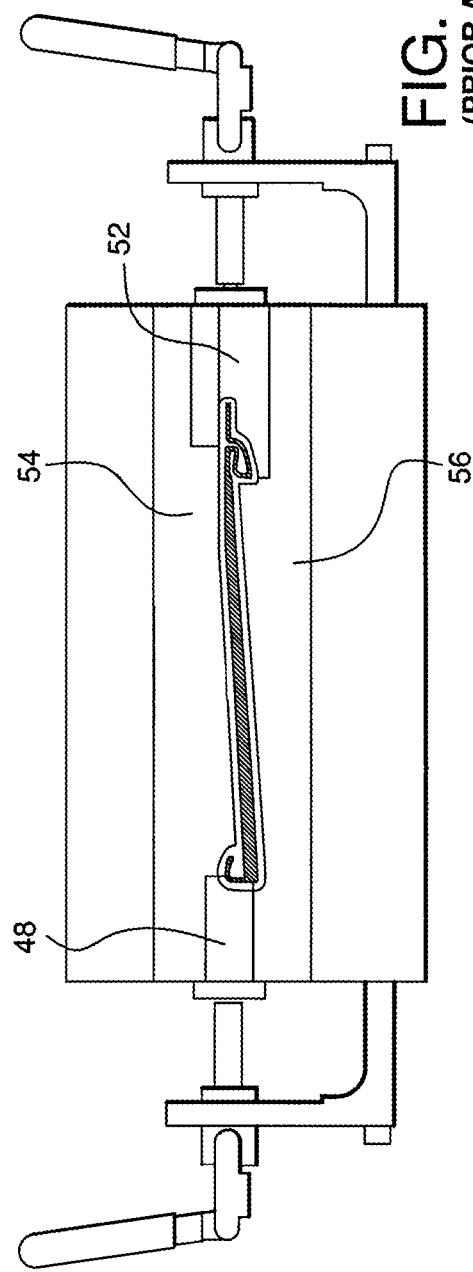

SIZER FOR FORMING SHAPED POLYMERIC ARTICLES AND METHOD OF SIZING POLYMERIC ARTICLES

CROSS-REFERENCE TO RELATED APPLICATION

This application is a continuation of U.S. patent application Ser. No. 11/294,956 filed Dec. 6, 2005, entitled Sizer for Forming Shaped Polymeric Articles and Method of Sizing Polymeric Articles," which is a divisional application of U.S. patent application Ser. No. 10/428,227 filed May 2, 2003, entitled "Improved Sizer for Forming Shaped Polymeric Articles and Method of Sizing Polymeric Articles" now U.S. Pat. No. 7,001,165, the entirety of each of which is hereby incorporated by reference herein.

FIELD OF THE INVENTION

The present invention relates to extrusion techniques, and more particularly to sizers used in shaping extruded polymeric articles.

BACKGROUND OF THE INVENTION

FIG. 1A illustrates a side elevational view of a prior art sizer 40 used in an extrusion system described in U.S. Pat. No. 6,319,456 to Gilbert et al., entitled "Method for Continuous Vacuum Forming Shaped Polymeric Articles," issued Nov. 20, 2001, the entirety of which is hereby incorporated by reference. An extruded sheet 10 is subjected to a sizer 40 for mechanical deforming and shaping an extruded sheet. One or more pre-sizers (not shown) may precede the sizer 40. A cross-section of the final sizer is shown in FIG. 1B. This device includes a series of adjustable blocks and plates. The final sizer 40 includes a pair of lateral forming block mechanisms 48 and 52 which can be lever operated for a variety of products and sizes. The final sizer 40 also includes top and bottom forming plates 54 and 56 to maintain the planar nature of the product while the edges are being formed.

Cooling water 42 from the final quench tank 46 is allowed to leak back into the final sizer 40 in order to cool the sheet 10 during sizing. The cooling water 42 quickly quenches the product below its heat deflection temperature to hold its shape. Excess cooling water 42 is removed from the sizer 40 by a vacuum pump 34 and is either removed from the system or recycled back into the quench tank 46.

Following the final sizer operation, the now fully formed extruded sheet 10 is immersed in a quench tank 46 to reduce its temperature to about that of ambient air. The continuous sheet is then removed from the quench tank 46. Following the removal of the product from the quench tank 46, the product can be pulled with the puller machine (not shown) to a cut-off station which severs the now cooled, formed extruded sheet into individual lengths of shaped polymeric articles.

Some prior art sizers additionally include water cavities therein for cooling the steel forming sections. These cavities are isolated from the extruded profile and serve to draw heat dissipated from the extruded profile into the steel shaping sections.

Market and manufacturing pressures are beginning to demand higher output capacities from extrusion processes, and thus sizers, in excess of 3000 lbs/hr of product. While these prior art extruder designs have proved reliable in the past, they have proved ineffective at meeting these increased output demands without sacrificing production quality. Prior art extruders generally require that the product profile cutout within the sizer be oversized at least between about 0.012-0.014 inches with respect to the nominal part thickness of the final cooled product. The sizer's channel must be oversized because it is unable to pull enough heat from the product before the product exits the sizer and is cooled in the quenching tank. The steel sizer also heats up, preventing effective removal of heat from the product. The oversize is necessary to prevent drag between the hot product against the steel sizer. The significant oversize leads to poor dimension control, and ultimately, poor product.

Therefore, there remains a need for a new sizer capable of improving product cooling to allow proper product shaping at higher output rates.

SUMMARY OF THE INVENTION

A sizer assembly for providing a shaped polymeric article in an extrusion process comprises a sizer body having a product profile channel generally corresponding to the shaped polymeric article to be formed therethrough. The sizer body comprises a plurality of cooling liquid inlet slots forming an opening substantially around the product profile channel and a plurality of vacuum slots forming an opening substantially around the product profile channel for removing cooling liquid expelled from said cooling liquid inlet slots.

A method of manufacturing a shaped polymeric article is also provided. A sheet of extruded hot polymeric material is provided to the sizer for cooling. A length of the sheet is severed after exiting the sizer to produce the shaped polymeric article.

The sizer provides improved cooling of the polymeric article being sized. This potentially allows for faster production speeds in excess of the limits of current sizers. Faster production speeds improve production output. These higher output speeds are accomplished even using a tighter, tapered or non-tapered, product channel. More even and consistent cooling of the product improves product performance through the presence of fewer cooled-in stresses. These cooled-in stresses are known to effect the impact, distortion and shrinkage qualities of the product. More accurate dimensioning and reduced product dimension variation, more consistent product faces, crisper angles and less product relaxation can also be achieved.

Further, because the cooling liquid pumped into the sizer is the primary means of removing heat from the product, the sizer body itself is not relied upon as the primary heat removal vehicle. It is believed that this will allow for the sizer to be manufactured out of lighter, cheaper and/or more wear resistant materials as well as make the sizer easier to manufacture. Still further, because the sizer need not pull the cooling liquid from a quench tank, more efficient post-sizer cooling mechanisms may be used, such as a shower or spray tank. Spray bath cooling is more efficient than submersion cooling and reduces the length of the cooling section of the extrusion line.

Even further, it is believed the that cooling water pumped into the sizer occupies the tight (e.g., 0.004-0.008 inch) space between the product and the sizer channel. The water acts as a lubricant or bearing mechanism that separates the polymeric product and the channel. This prevents drag between the product and the sizer and reduces wear on the sizer, thereby permitting the sizer to be manufactured from materials less wear resistant than steel, if desired.

In still a further embodiment of this invention, a sizer assembly for shaping a polymeric article, which is above its glass transition temperature, that is being drawn or extruded is provided. The sizer assembly comprise a sizer body having a product profile channel disposed in a first generally horizontal direction, a plurality of cooling liquid inlet and outlet apertures disposed through the sizer body and in open communication with the product profile channel.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIG. 1A is a side elevational view of a prior art sizer coupled to a quenching tank;

FIG. 1B is a cross-sectional view of the prior art sizer of FIG. 1A taken along lines 1B-1B;

DETAILED DESCRIPTION

Figure 2:
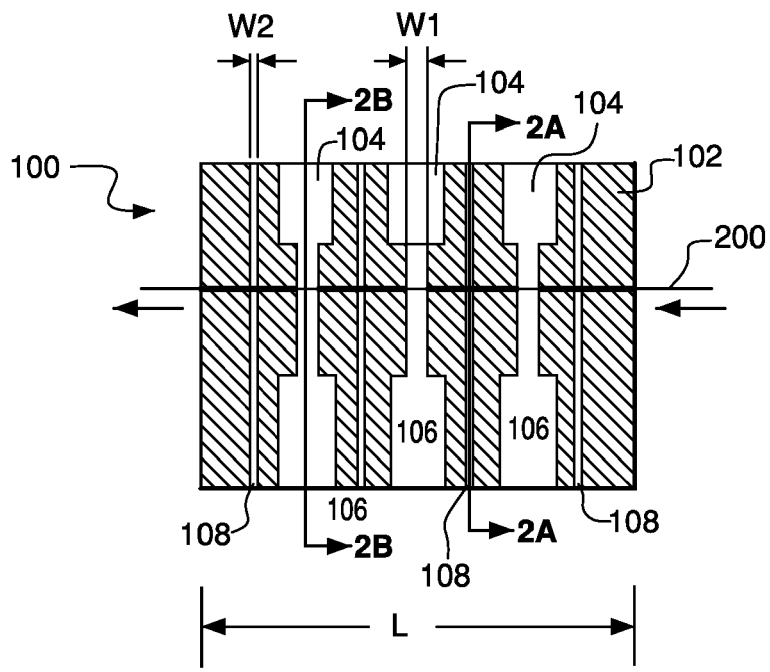
FIG. 2 is a side, cross-sectional view of an exemplary sizer according to the present invention.
Figure 3:
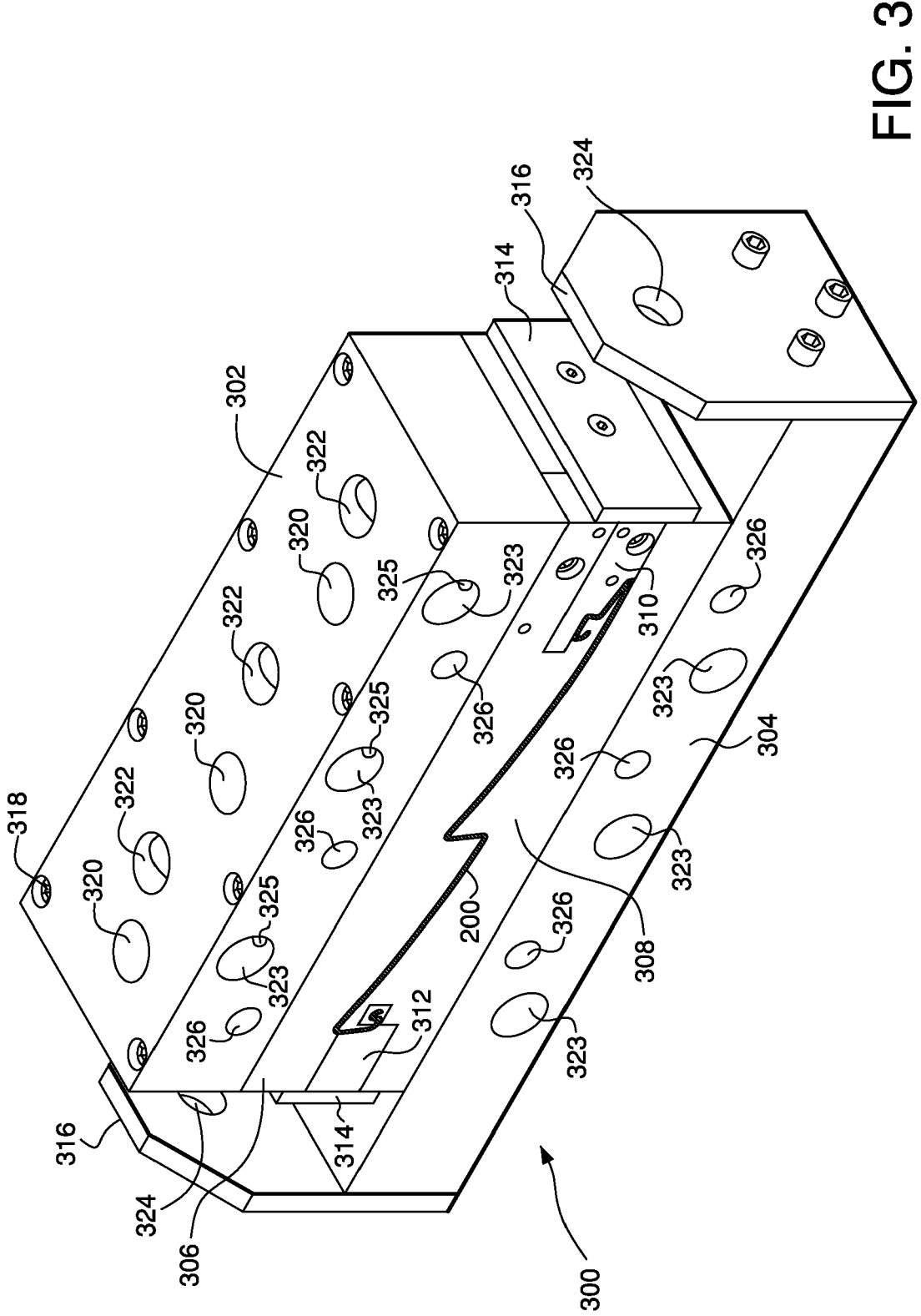
FIG. 3 is a perspective view of an assembled sizer according to the present invention.
Figure 3A:
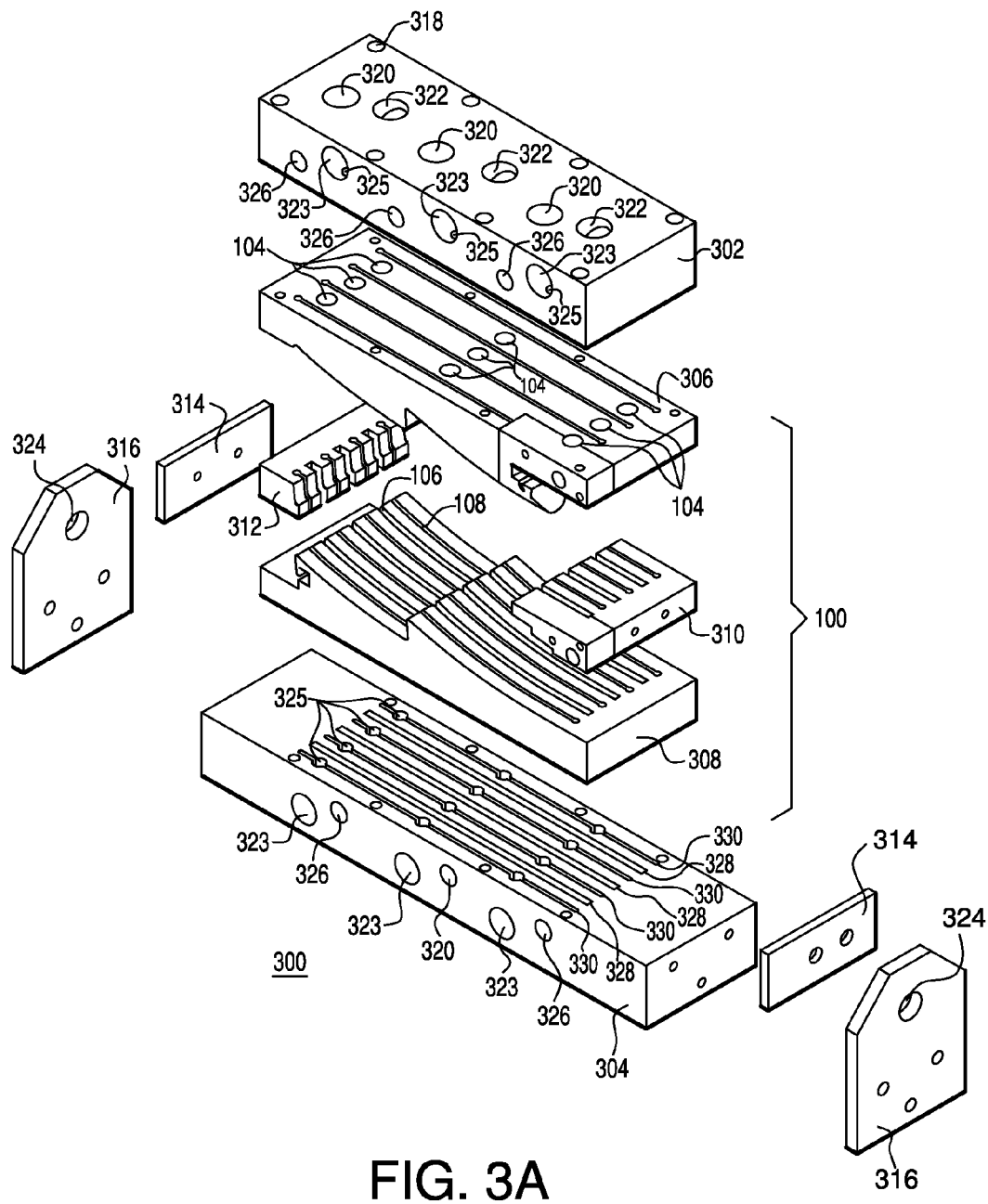
FIG. 3A is an exploded view of the sizer of FIG. 3 illustrating the components thereof.

FIGS. 2-3A illustrate an exemplary embodiment of a sizer (also known as a fixture or calibrator) and sizer assembly for providing a shaped polymeric article in an extrusion process. The polymeric article can be any shaped polymeric article originating from a flat sheet or non-flat sheet (e.g., having one or more legs or fins formed therein) exiting an extruder having a profile of uniform or non-uniform thickness or having preformed and cooled sections. In an exemplary embodiment, the sizer is shaped to form a siding panel formed from a thermoplastic or thermosetting compositions, such as polyvinyl chloride ("PVC"), polyethylene, polypropylene, polyurethane, epoxy, polyester, or composites thereof (e.g., PVC and wood flour composite), etc. or other similar materials.

FIG. 2 is a side, cross-sectional view of a sizer 100. An extruded sheet of polymeric material 200 is shown disposed within the sizer 100. As used herein, "sheet of polymeric material" means a sheet of polymeric material of uniform or non-uniform thickness. The sheet may be of uniform temperature or may be partially preformed and cooled in two dimension or three dimensional form, as taught, for example, in U.S. Pat. No. 6,319,456 to Gilbert discussed in the "Background of the Invention" section. The sizer has body 102 preferably made from steel, although other metals, ceramic materials, wood, plaster, or polymeric materials such as heat-resistant epoxy, polyoxybenzlene, polymide, PAI (polyamide-imide), silicone, PEI (polyether-imide), PEEK (polyetheretherketone), acrylics, phenolics, and wear surface treated materials (e.g., a diamond coated acrylic), or composites are also contemplated, as analyzed in more detail below. The sizer 100 has a product profile channel formed through body 102 (shown occupied by polymeric article 200) corresponding generally to the shape of polymeric article 200.

The extruded sheet of polymer enters the sizer at a temperature above ambient. More specifically, portions of the sheet that are to be formed by the sizer are above the polymer's glass transition temperature. A material's glass transition temperature (Tg) is the temperature below which molecules have very little mobility. On a larger scale, polymers are rigid and brittle below their glass transition temperature and elastic above it. Glass transition temperature is usually applicable to amorphous phases and is commonly applicable to glasses and plastics. By way of example, PVC is generally formable above 170° F.

In an exemplary embodiment, the portions of the product profile channel used to size and shape the polymeric product are sized less than 0.012", preferably between about 0.001-0.012", and more preferably between about 0.004-0.008", greater than the nominal part thickness of the final profile size of the shaped polymeric article. This is a reduction from the standard 0.012-0.014" oversize described in the "Background" section. As described in more detail below, it is believed that this reduction is made possible by the improved heat removal abilities of the sizer 100. Further, the reduced size allows for the cooling liquid to act as a bearing mechanism between the product and the sizer profile channel.

Figure 2A:
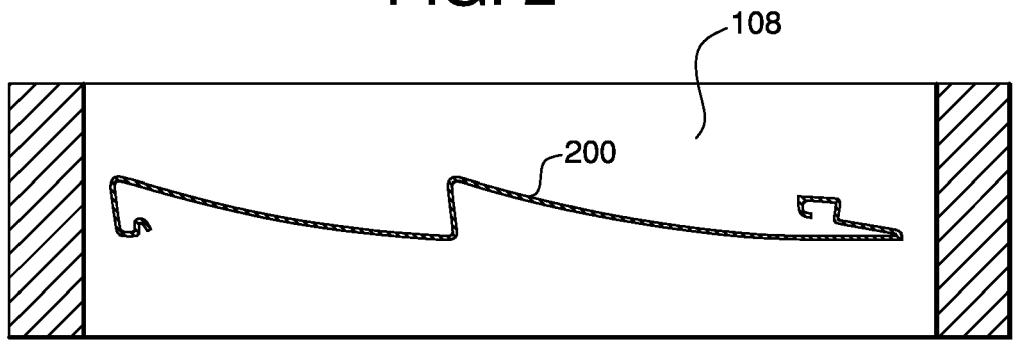
FIG. 2A is a cross-sectional view of the sizer of FIG. 2 taken along lines 2A-2A.
Figure 2B:
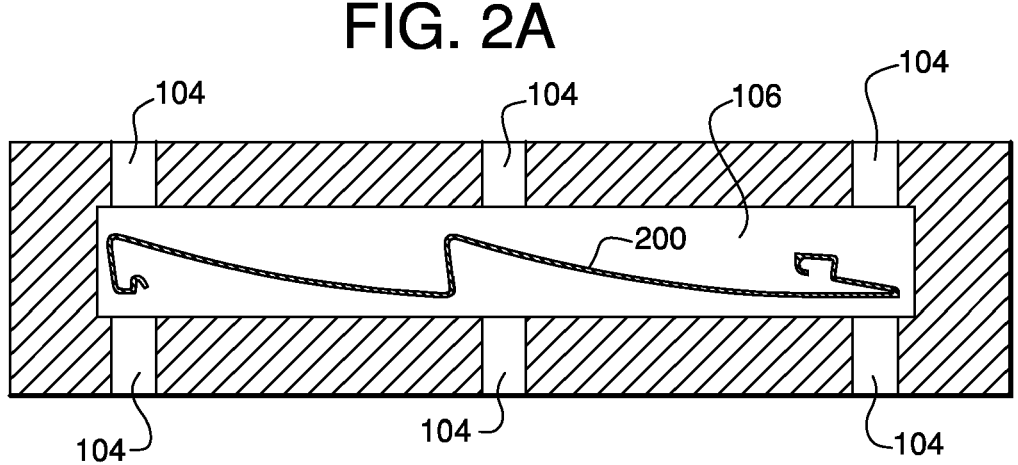
FIG. 2B is a cross-sectional view of the sizer of FIG. 2 taken along lines 2B-2B.

In an exemplary embodiment, the sizer 100 includes a plurality of cooling liquid inlet apertures, such as slots 106, holes or combinations thereof, forming an opening partially, or substantially around, and preferably entirely around, the product profile channel. These apertures may be isolated to specific areas of the panel profile, if desired, to allow individual control of cooling liquid flows in contact with specific regions of the polymeric article. Each slot 106 is preferably coupled to a plurality of upper and lower cooling liquid inlet ports 104 that provide access to slots 106 for a cooling liquid, such as water. As best shown in the cross-sectional view of FIG. 2B taken along lines 2B-2B of FIG. 2, an exemplary sizer 100 includes six inlet ports 104 disposed around each slot 106. As best shown in FIG. 2, a sizer 100 having a length L of approximately 4.0" has three spaced slots 106 formed therein.

Cooling liquid inlet slots and ports should be sized to allow for adequate cooling liquid volumes and the desired liquid distribution over the product, which depend on such factors as the shape of the product, the speed of the product and the temperature of the product. In an exemplary embodiment, cooling liquid inlet slots 106 have a width $W_1$ between about 0.020"-0.500" and preferably at least about 0.25". Inlet ports 104 have diameters between about 0.250"-1.00", and preferably at least about 0.5".

Sizer 100 preferably includes a plurality of spaced outlet apertures, such as vacuum slots 108, forming an opening partially, or substantially around, and preferably entirely around, the product profile channel for draining and/or removing cooling liquid expelled from the cooling liquid inlet slots 106. The vacuum slots 108 are preferably disposed before, in between and/or after the cooling liquid inlet slots 106, as best seen in FIG. 2. The cross-section view of FIG. 2A taken along lines 2A-2A of FIG. 2 illustrates a slot 108 forming an opening entirely around the product profile channel. The direction of the product profile through the sizer 100 is illustrated by directional arrows in FIG. 2. The first vacuum slot 108 disposed closest to the entrance of the sizer 100 helps to ensure that cooling liquid does not escape through the entrance of the sizer.

Vacuum slots 108 are preferably sized to achieve relative even distribution of vacuum forces. In an exemplary embodiment of sizer 100, vacuum slots 108 have a width $W_2$ between about 0.010"-0.250", and preferably at least 0.04".

FIG. 3 is a perspective view of an exemplary sizer assembly 300, and FIG. 3A is an exploded view showing the components thereof. The sizer body is formed from one or more sections defining the product profile channel. In the illustrated embodiment, sizer assembly 300 includes a sizer 100 including four steel sections 306, 308, 310, 312 that mate together to define the product profile channel through the sizer 100. The inlet ports 104 can be seen in top section 306 of sizer 100. Similar inlet ports (not shown) may be found on the underside of bottom section 308. The vacuum slots 108 and water slots 106 are visible in the exploded view of FIG. 3A.

The sizer assembly 300 includes top and bottom aluminum manifolds 302 and 304, respectively. Although shown as separate parts of a sizer assembly 300, it is contemplated that the manifold can be formed integrally with the sizer 100. The top manifold 302 is shown secured to the top sizer section 306 via bolts disposed within holes 318, but the manifold sections may be coupled to the sizer by other means, such as by piping sections. Bolting plates 316 are bolted to bottom manifold 304. Rectangular side panels 314 are bolted to intermediate sizer sections 310, 312. Holes 324 are shown drilled for insertion of toggle handles (not shown in FIGS. 3, 3A) as described in connection with prior art FIGS. 1A, 1B for securing sections 310, 312 in sizer 100.

It should be understood that manifold sections 302, 304 may be designed in any number of configurations. The only requirement for manifolds 302, 304 is that the vacuum/suction chambers and cooling liquid chambers be isolated within the manifold so that there is no interchange therebetween. In an exemplary embodiment, manifold sections 302, 304 have essentially the same connection system formed therein.

An exemplary manifold section 302, 304 includes cooling liquid (e.g., water) inlet ports 320 drilled therein from the top side, each corresponding to a group of three inlet ports 104 formed into a top or bottom section 306, 308. Ports 320 preferably have a diameter of at least about ½". Water slots 328 are machined into the manifolds 302, 304 to a depth of about ¾". The water slots 328 are connected to the inlet ports 320 by side channels 326 drilled into the manifolds 302, 304. Although side channels 326 are shown open, the ends of these channels are plugged when the sizer is in use in order to prevent liquid from escaping and air from entering. Each inlet port 320 on the manifolds 302, 304 can be connected to a separate water pump and be individually controlled if desired. Individual control may be desirable if more or less cooling is required or desired at specific locations of the polymeric article. This control may also be achieved by isolating inlet slots or inlet ports to specific regions of the polymeric article as noted above.

An exemplary manifold section 302, 304 also includes three draining, vacuum and/or suction ports 322 drilled therein. Suction ports 322 preferably have a diameter of at least about ½". Vacuum slots 330 are machined about ¼" into the manifolds 302, 304 and correspond to vacuum slots 108 formed in the sizer 100. Side channels 323 are drilled across the manifolds 302, 304 and intersect vacuum ports 322. Although the channels 323 are shown open, the ends of these channels 323 are plugged when the sizer is in use in order to prevent liquid from escaping during removal of the liquid. Twelve connection holes 325 are drilled through the manifolds 302, 304 in vacuum slots 330 to intersect side channels 323, thereby coupling ports 322 to slots 330. In an exemplary embodiment, each port 322 on top manifold 302 and each port 322 on bottom manifold 304 are coupled to a single suction source (e.g., a pump) for removal of cooling liquid, e.g., water. However, it is contemplated that the vacuum slots or apertures may be configured for individual control.

In operation, the sizer 100 primarily utilizes a large volume of cooling liquid, preferably water, to cool the polymeric product profile as it moves through the sizer. The product profile 200 typically has a temperature of between about 240-260° F. as it enters the sizer 100. Water is pumped into the sizer assembly through ports 320, where it enters channels 326 and then enters water slots 328 of manifolds 302, 304. It is preferred to utilizes a water slot configuration (i.e., water slots 328) in order to balance water flows and pressure around the product and to prevent flow from "short cutting" through the system. The water slots 328 overlap inlet ports 104 of sizer 100, which connect to cooling liquid inlet slots 106 so that water contacts the product 200, removing heat therefrom. The water cools the product and provides a bearing layer between the product 200 and the product profile channel defined through the sizer 100. The water is then removed via vacuum slots 108 as described below.

The amount of cooling liquid injected into cooling liquid inlet slots 106 is preferably individually controlled for each port 320, but preferably ranges between about 1.5-6.0 GPM (gallons per minute) per port 320. In the embodiment shown in FIGS. 2-3A, this range amounts to between about 0.5-2 GPM per inlet port 104. The suction placed on vacuum slots 108 is preferably evenly distributed across the vacuum slots and from the entry to exit points of the sizer.

As mentioned, water is removed from the sizer 100 via vacuum slots 108 of sizer 100. The vacuum slots 108 overlap slots 330 machined into the manifolds 302, 304 of the sizer assembly 300. The water enters holes 325 from slots 330 and is pulled into channels 323 through to vacuum ports 322, where it is removed from the assembly 300. In operation, each vacuum port 322 preferably operate at a force or vacuum level sufficient to suction water from the vacuum slot opening at a rate equal to or above the rate the cooling liquid is fed through the inlet ports. In one embodiment, each vacuum port 322 operates at a force greater than 10" vacuum.

As mentioned, the sizer 100 and sizer assembly 300 may be used in the formation of a shaped polymeric article in an extrusion process. The details of the extrusion process and the components therein should be familiar to those of ordinary skill and are summarized hereafter. A flat sheet of a polymeric material, such as PVC, is extruded. A wood grain finish or other finish may optionally be applied to the extruded sheet in a press roller or areas may be pre-formed and cooled via other means, such as those described in U.S. Pat. No. 6,319,456 to Gilbert. A cooling roller or other method is used to reduce the PVC temperature from about 400° F. to about 250° F. The PVC sheet is then optionally applied to one or more pre-sizers to shape the product. After the pre-sizer, the PVC sheet is provided to the sizer 100 of sizer assembly 300. After the sizer, the shaped polymeric article is typically pulled through a quenching tank. After exiting the quenching tank, the shaped polymeric article is cut into appropriate lengths for a final product.

The improved heat removal capabilities of the new sizer design as described above were verified using finite element analysis (FEA) using approximately a 200,000 element model for a prior art sizer and the new sizer design. The velocity of the PVC sheet, the conductivity of water and air, the cooling water temperature and convection coefficient, and the thermal conductivity and heat capacity of the polymer were all variables in the analysis. Observation of thermal isobars for the prior art sizer design and new sizer design, as well as the product moving through the designs, revealed more uniform increased BTU removal in the product sized with the new design and less heat dissipation from the product into the new sizer body. This indicates that the cooling water served as the primary heat removal vehicle.

The sizer 100 described above was also built and tested. Test results indicated that the tested sizer design was capable of pulling over 800 BTUs per minute from the product, based on tests on the cooling water during a product run where the input product surface temperature was measured at 245° F., the output product surface temperature was measured at 140° F. and the product speed was about 1800 inches per minute.

The sizer 100 provides several advantages. The sizer provides improved cooling of the polymeric article being sized. This allows for faster production speeds in excess of the estimated 3900 lb/hr limit of current sizers. Faster production speeds improve production output. These higher output speeds are accomplished even using a tighter, non-tapered product channel, which provides more accurate dimensioning and reduced product dimension variation. Indeed, more consistent product faces, crisper angles and less product relaxation were observed using the sizer.

It should be understood that the channel of the sizer described herein has a substantially uniform shape, but may be implemented with all, portions or none of the channel being tapered. Still further, portions of the channel may be oversized with respect to the product while other portions are characterized by less or little oversize. This configuration may be utilized, for example, when various portions of the product are pre-formed and cooled prior to the sizer.

Further, because the cooling liquid pumped into the sizer is the primary means of removing heat from the product, the sizer body itself is not relied upon as the primary heat removal vehicle. Put another way, the thermal conductivity of the steel is not required to remove heat from the product. It is believed that this will allow for the sizer to be manufactured out of lighter, cheaper and/or more wear resistant materials, such as polymeric materials such as heat-resistant epoxy, polyoxybenzlene, polymide, PAI (polyamide-imide), silicone, PEI (polyether-imide), PEEK (polyetheretherketone), acrylics, phenolics, composites, and wear surface treated materials (e.g., a diamond coated acrylic). Other metals, ceramic materials, wood, plaster, or composites are also contemplated. Cooler water can also be used to cool the product because a source of water other than the quenching tank can be used. Higher volumes of water are used to cool the product, leading to improved cooling. Still further, because the sizer 100 need not pull the cooling liquid from a quench tank, more efficient post-sizer cooling mechanisms may be used, such as a shower or spray tank. Spray bath cooling is more efficient than submersion cooling and reduces the length of the cooling section of the extrusion line.

Even further, it is believed the that cooling water pumped into the sizer occupies the tight (e.g., 0.004-0.008 inch) space between the product and the sizer channel. The water acts as a lubricant or bearing mechanism that separates the polymeric product and the channel. This prevents drag between the product and the sizer and reduces wear on the sizer, thereby permitting the sizer to be formed from materials that are less wear resistant than steel, if desired.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A method of manufacturing a non-hollow, shaped polymeric article, comprising the steps of:
    providing a generally flat extruded sheet of hot polymeric material having an outer surface to a sizer assembly for non-vacuum sizing of said polymeric sheet into a non-hollow, shaped polymeric article, wherein said sizer assembly comprises:
    a sizer body having a product profile channel corresponding to said shaped polymeric article formed therethrough, said sizer body further comprising a plurality of independent, spaced cooling liquid inlet slots, each formed in a plane generally orthogonal to the longitudinal axis of said product profile channel, each forming an opening substantially around said product profile channel, said cooling liquid inlet slots being in open communication with said product profile channel, and a plurality of independent, spaced vacuum slots, each formed in a plane generally orthogonal to the longitudinal axis of said product profile channel, each forming an opening substantially around said product profile channel for removing cooling liquid expelled from said cooling liquid inlet slots, said vacuum slots being interspersed among, and fluidly insulated from said cooling liquid inlet slots, except in said product profile channel;
    providing cooling liquid to said outer surface of said extruded sheet of hot polymeric material through said cooling liquid inlet slots for cooling said extruded sheet of hot polymeric material, wherein said cooling liquid is provided in a sufficient quantity to serve as the primary means within the sizer body for removing heat from the extruded sheet of hot polymeric material;
    applying suction to the vacuum slots at a level sufficient for removing the cooling liquid from the product profile channel at a rate at least equal to a rate at which the cooling liquid is provided to the product profile channel but insufficient to draw said extruded sheet of hot polymeric material against said sizer body, wherein the cooling liquid quantity and suction level are balanced such that in the product profile channel a substantial portion of said outer surface of said sheet of hot polymeric material is maintained away from said sizer body by a bearing layer of cooling liquid as said sheet of hot polymeric material passes through said sizer body; and
    severing a length of said sheet after exiting said sizer body to produce said shaped polymeric article.

2. The method of claim 1, further comprising the step of cooling said sheet after it exits the sizer body in a quenching tank.

3. The method of claim 1, further comprising the step of cooling said sheet after it exits the sizer body in a spray bath.

4. The method of claim 1, wherein the product profile channel has a substantially uniform shape along its longitudinal axis and is sized less than 0.012 inches greater than a nominal thickness of said shaped polymeric article.

5. The method of claim 1, wherein the product profile channel has a substantially uniform shape along its longitudinal axis and is sized between about 0.004-0.008 inches greater than a nominal thickness of said shaped polymeric article.

6. The method of claim 5, wherein said extruded sheet of hot polymeric material is provided to the sizer assembly at a rate of at least 3900 lb/hr.

7. The method of claim 1, wherein said sizer body is formed from a polymeric material selected from the group consisting of heat-resistant epoxy, polyoxybenzlene, polymide, polyamide-imide, silicone, polyether-imide, polyetheretherketone, acrylics and phenolics.

8. The method of claim 1, wherein, for a sizer approximately 4.0 inches in length, said sizer pulls at least about 800 BTUs/minute from said extruded sheet at a product speed of about 1800 inches per minute, or proportionate amount of BTUs/minute for different sized sizers.

9. The method of claim 1, wherein, for a sizer approximately 4.0 inches in length, the cooling liquid is provided and removed from said product profile channel at at least 9 gallons per minute, or proportionate amount of cooling liquid for different sized sizers, is provided and removed from the product.

10. The method of claim 1, wherein, for a sizer approximately 4.0 inches in length, the cooling liquid is provided and removed from said product profile channel at between about 9-36 gallons per minute, or proportionate amounts of cooling liquid for different sized sizers.

11. The method of claim 1, wherein said sizer body has top and bottom surfaces and a pair of side surfaces, wherein at least some of said vacuum slots are formed completely through said sizer body from said top surface to said bottom surface and spaced from said side surfaces, and
wherein at least some of said cooling liquid inlet slots are formed only partially through said sizer body between said top and bottom surfaces, said sizer body further comprising a plurality of cooling liquid inlet ports formed in said sizer body for providing access to said cooling liquid inlet slots formed only partially through said sizer body.

12. The method of claim 11, further comprising top and bottom manifold sections coupled to said sizer body, each of said top and bottom manifold sections including at least one input port coupled to at least one source of cooling liquid and at least one vacuum port coupled to at least one vacuum source, said manifold sections further being configured to place said at least one source of cooling liquid in communication with said cooling liquid inlet ports of said sizer body and to place said at least one vacuum source in communication with said at least some of said vacuum slots.

13. The method of claim 1, wherein the vacuum slots have widths in the longitudinal direction of the sizer body between about 0.010"-0.250".

14. A method of manufacturing a non-hollow, shaped polymeric article, comprising the steps of:
providing a generally flat sheet of hot polymeric material having an outer surface to a sizer assembly for non-vacuum sizing of said polymeric sheet into a non-hollow, shaped polymeric article, said polymeric sheet being above its glass transition temperature, wherein said sizer assembly comprises:
a sizer body having a product profile channel disposed in a first generally horizontal direction, a plurality of longitudinally spaced cooling liquid inlet and outlet apertures disposed through said sizer body and in open communication with said product profile channel, said cooling liquid outlet apertures being interspersed among, and fluidly insulated from said cooling liquid inlet apertures, except in said product profile channel;
providing cooling liquid to said outer surface of said extruded sheet of hot polymeric material through said cooling liquid inlet apertures for cooling said extruded sheet of hot polymeric material, wherein said cooling liquid is provided in a sufficient quantity to serve as the primary means within the sizer body for removing heat from the extruded sheet of hot polymeric material;
applying suction to the cooling liquid outlet slots at a level sufficient for removing the cooling liquid from the product profile channel at a rate at least equal to a rate at which the cooling liquid is provided to the product profile channel but insufficient to draw said extruded sheet of hot polymeric material against said sizer body, wherein the cooling liquid quantity and suction level are balanced such that in the product profile channel a substantial portion of said outer surface of said sheet of polymeric material is maintained away from said sizer body by a bearing layer of cooling liquid, thereby reducing drag on said extruded sheet of hot polymeric material as it passes through said sizer body; and
severing a length of said sheet after exiting said sizer body to produce said shaped polymeric article.

15. The method of claim 14, wherein said outlet apertures are alternatingly arranged with said inlet apertures.

16. The method of claim 14, wherein a portion of said plurality of cooling liquid inlet and outlet apertures are disposed orthogonal to said generally horizontal product profile channel.

17. A method of manufacturing a non-hollow, shaped polymeric article, comprising the steps of:
providing a generally flat extruded sheet of hot polymeric material having an outer surface to a sizer assembly for non-vacuum sizing of said polymeric sheet into a non-hollow, shaped polymeric article, said sizer assembly comprising a sizer body having a product profile channel corresponding to said shaped polymeric article formed therethrough, said product profile channel having the shape of a siding panel;
providing at least one source of cooling water for said sizer assembly;
providing at least one suction source for said sizer assembly, said suction source comprising a plurality of vacuum slots each forming an opening substantially around the product profile channel for removing the cooling water;
providing the cooling water from the at least one source of cooling water to the outer surface of said extruded sheet of hot polymeric material in the product profile channel for cooling said extruded sheet of hot polymeric material, wherein said cooling water is provided in a sufficient quantity to serve as the primary means within the sizer body for removing heat from the extruded sheet of hot polymeric material;
applying suction to the product profile channel via said suction source at a level sufficient for removing the cooling water from the product profile channel at a rate at least equal to a rate at which the cooling water is provided to the product profile channel but insufficient to draw said extruded sheet of hot polymeric material against said sizer body, wherein the cooling water quantity and suction level are controlled such that in the product profile channel a substantial portion of said outer surface of said extruded sheet of hot polymeric material is maintained away from said sizer body by a bearing layer of the cooling water as said sheet of polymeric material passes through said sizer body.

18. The method of claim 17, wherein the product profile channel has a non-tapered, substantially uniform shape along its longitudinal axis and is sized less than 0.012 inches greater than a nominal thickness of said shaped polymeric article.

19. The method of claim 17, wherein the product profile channel has a non-tapered, substantially uniform shape along its longitudinal axis and is sized between about 0.004-0.008 inches greater than a nominal thickness of said shaped polymeric article.

20. The method of claim 19, wherein at least 9 gallons per minute of said cooling water are provided to and removed from the product profile channel.

* * * * *